United States Patent [19]

Panhorst et al.

[11] Patent Number: 5,437,878
[45] Date of Patent: Aug. 1, 1995

[54] CHEWING GUM EXHIBITING REDUCED ADHERENCE TO DENTAL WORK

[75] Inventors: Dorothy A. Panhorst, Morris Plains; John M. Cahill, Newfoundland, both of N.J.

[73] Assignee: Nabisco, Inc., Parsippany, N.J.

[21] Appl. No.: 150,657

[22] Filed: Nov. 10, 1993

[51] Int. Cl.$^6$ .................................. A23G 3/30
[52] U.S. Cl. ............................. 426/4; 426/3; 426/6
[58] Field of Search .......................... 426/3–6

[56] References Cited

U.S. PATENT DOCUMENTS

| | | | |
|---|---|---|---|
| 3,974,293 | 8/1976 | Witzel | 426/4 |
| 3,984,574 | 10/1976 | Comollo | 426/4 |
| 4,241,091 | 12/1980 | Stroz et al. | 426/4 |
| 4,352,822 | 10/1982 | Cherukuri et al. | 426/4 |
| 4,357,355 | 11/1982 | Koch et al. | 426/4 |
| 4,387,108 | 6/1983 | Koch et al. | 426/4 |
| 4,415,593 | 11/1983 | Glass et al. | 426/4 |
| 4,518,615 | 5/1985 | Cherukuri et al. | 426/4 |
| 5,087,459 | 2/1992 | Chuu et al. | 426/4 |
| 5,266,336 | 11/1993 | McGrew et al. | 426/4 |

*Primary Examiner*—Donald E. Czaja
*Assistant Examiner*—Lien Tran

[57] ABSTRACT

Disclosed are chewing gum compositions exhibiting a reduced tendency to adhere undesirably to solid dental surfaces in the mouth, the compositions comprising a gum base which comprises about 8 to about 18 wt. % of low molecular polyisobutylene; about 1 to about 4 wt. % of high molecular weight polyisobutylene; about 16 to about 30 wt. % of polyvinyl acetate; about 16 to about 30 wt. % of inorganic filler; about 1 to about 6 wt. % of polyethylene; about 18 to about 30 wt. % of a fat component selected from the group consisting of hydrogenated and partially hydrogenated vegetable oils and mixtures thereof; about 1 to about 6 wt. % of emulsifier; and about 2 to about 10 wt. % of microcrystalline wax.

8 Claims, No Drawings

CHEWING GUM EXHIBITING REDUCED ADHERENCE TO DENTAL WORK

BACKGROUND OF THE INVENTION

The present invention relates to chewing gums and more particularly to chewing gums exhibiting improved mouth feel and flavor retention while exhibiting simultaneously little or no tendency to adhere to the hard surfaces within the mouth, including teeth, fillings, dentures, and the like.

It is widely recognized that conventional chewing gum has a well-known tendency to stick not only to itself but also to any surface with which it comes into contact. Thus, it has generally been accepted that chewing gum is necessarily tacky, once it is masticated and moistened, such that it will adhere to floors, pavement, wastebaskets, and the like, a phenomenon which is a familiar part of the everyday world.

However, this tendency to adhere to surfaces also gives the gum a tendency to adhere to solid surfaces within the mouth, including the surfaces of the natural teeth, to fillings and particularly to other dental work such as crowns, bridges, and most particularly dentures. This tendency of chewing gum to adhere to such surfaces has generally been assumed to be a necessary draw-back to be tolerated if one wishes to enjoy the more desirable aspects of chewing gum.

Attempts to modify the tendency of chewing gum to stick where it is not desired, such as to dental work in the mouth, have not surprisingly led to modified gum formulations which have proven unattractive for any of a variety of reasons. The problem can be summarized by recognizing that a chewing gum formulation requires a careful balancing of the identities, properties, and amounts of the components which make up the chewing gum base, as well as of those components which are added to the gum base such as extenders, flavorants, sweeteners, and the like. Thus, it can be appreciated that alteration of one or more aspects of a chewing gum formulation, whether it be changing ingredients, amounts, ratios of ingredients, or any other aspect, may have an unpredictable effect on the properties of the chewing gum product. Thus, any adjustment to a chewing gum formulation in the attempt to reduce the tendency of the gum to stick to dental surfaces in the mouth runs a significant risk of sacrificing one or more of a gum's more desirable properties enumerated herein. In that case, a gum exhibiting a lessened tendency to stick to dental work will nonetheless not be a satisfactory product.

Thus, there remains a need for a chewing gum formulation having a reduced tendency, or complete freedom, from adhering to dental work in the mouth, which retains or even improves the other properties which are all desired of a commercially satisfactory chewing gum formulation.

DISCUSSION OF THE PRIOR ART

One attempt to formulate a chewing gum having a reduced tendency to stick to other solid surfaces is described in U.S. Pat. No. 3,984,574. This patent discloses a chewing gum said to contain 5–35% of an elastomer which can be polyisobutylene, polyisoprene and isobutylene-isoprene copolymer or a butadiene-styrene copolymer; 5–50% of hydrogenated or partially hydrogenated vegetable oils or animal fats; 5–40% of mineral adjuvants; polyvinyl acetate in an amount up to 55%; fatty acids present in an amount up to 20%; and mono and diglycerides of fatty acids present in amounts up to 10%.

This patent specifically teaches that using wax as an ingredient in conjunction with rubber will not produce a non-stick formulation. By contrast, the gums of the present invention utilize a combination of wax and rubber which create a product that both is non-stick and has superior flavor duration and texture over products believed to be based on the teachings of U.S. Pat. No. 3,984,574.

U.S. Pat. No. 4,518,615 purports to describe a chewing gum that is said not to adhere to dentures and other dental surfaces. The gum includes an elastomer, an elastomer solvent, polyvinyl acetate, emulsifier, low molecular weight polyethylene, waxes, plasticizer and filler. The elastomer solvents disclosed are methyl, glycerol and pentaerythritol esters of rosins and modified rosins, and resins such as terpenes. The present inventors have discovered that these elastomer solvent components can detract from the desired properties of the gum; accordingly, the gums of the present invention do not have such a component.

BRIEF SUMMARY OF THE INVENTION

The present invention satisfies this need, while exhibiting the advantageous properties enumerated herein. For instance, the chewing gum according to the present invention is satisfactorily soft so that the initial chews of a new piece of gum quickly begin to convert it to the desired fully masticated state. The gum remains soft throughout the chew. The gum according to the present invention also exhibits an initial release of flavor and/or sweetness upon the initial bite, exhibits long flavor retention throughout the course of mastication in the mouth, and remains integral rather than disintegrating or dissolving during the course of mastication.

The chewing gum of the present invention comprises a gum base, and also optionally comprises one or both of a sweetener component and a flavor component, wherein the gum base comprises about 8 to about 18 wt. % of low molecular weight polyisobutylene; about 1 to about 4 wt. % of high molecular weight polyisobutylene; about 16 to about 30 wt. % of polyvinyl acetate having a weight average molecular weight of about 7,000 to about 13,000; about 16 to about 35 wt. % of an inorganic filler; about 1 to about 6 wt. % of polyethylene having a weight average molecular weight of about 2,000; about 18 to about 30 wt. % of a fat component selected from the group consisting of hydrogenated and partially hydrogenated vegetable oils and mixtures thereof; about 1 to about 6 wt. % of emulsifier; and about 2 to about 10 wt. % of microcrystalline wax.

DETAILED DESCRIPTION OF THE INVENTION

Chewing gums in accordance with the present invention, comprise a gum base which represents a carefully optimized combination of ingredients and amounts thereof. In the following description, each of the ingredients will be discussed in turn. It should be recognized, however, that in the present invention, the result is indeed greater than the sum of the contributions of each of the component ingredients, and nothing in the following discussion should be taken as representing that any particular ingredient contributes only the properties which it would be expected to contribute to any other gum base formulation in any other context.

The present invention thus resides in considerable part in the effective combination of properties exhibited by the gum base itself and by chewing gums incorporating that gum base, so it should be borne in mind that the properties exhibited by the product are very much the result of the combined presence of each of the ingredients described herein, present in the relative amounts described herein.

The gum base contains about 8 wt. % to about 18 wt. % of low molecular weight polyisobutylene, preferably having a Flory molecular weight of about 49,000 to 60,000. The gum also contains about 1 wt. % to about 4 wt. % of high molecular weight polyisobutylene which preferably has a Flory molecular weight of about 750,000 to about 1,000,000. Polyisobutylene is an elastomer, and thus contributes chewability and good mouth feel to the gum base and to gums containing the gum base.

The gum base in accordance with the present invention also includes about 16 wt. % to about 30 wt. % of polyvinyl acetate having a weight average molecular weight in the range of about 7,000 to 13,000. The gum base according to the present invention also contains about 1 wt. % to about 6 wt. % of polyethylene. Polyethylene found to be particularly useful in the gum bases of the present invention has a molecular weight of about 2,000.

The gum base in accordance with the present invention further contains about 16 wt. % to 30 wt. % of an inorganic filler. The filler is preferably selected from the group consisting of aluminum hydroxide, magnesium hydroxide, alumina, aluminum silicates, calcium carbonate, and talc, and combinations thereof. The preferred filler is food grade calcium carbonate.

The gum base in accordance with the present invention also contains about 18 wt. % to about 35 wt. % of a fat component selected from the group consisting of hydrogenated and partially hydrogenatedvegetable oils and mixtures thereof, said group including but not limited to soybean, cottonseed, corn, peanut and palm oils, and animal fats such as lard and tallow.

The gum base of the present invention also contains about 1 wt. % to about 6 wt. % of an emulsifier which is preferably a mono- or di- glyceride ester of a fatty acid. An example is glycerol monostearate.

The gum base of the present invention also contains about 2 wt. % to about 10 wt. % of microcrystalline wax. This component is believed to be especially surprising in view of the prior art teaching against the presence of a wax component in a non-stick gum. The preferred microcrystalline wax has a melt point in the range of 165° F. to 195° F.

As indicated above, the chewing gums of the present invention preferably do not contain a resin or rosin component or derivative such as the methyl, glycerol or pentaerythritol ester of rosins or modified rosins, such as hydrogenated, dimerized, or polymerized rosins. Examples of such components absent from this invention include the pentaerythritol ester of wood rosin, glycerol ester of wood rosin, of partially dimerized wood rosin, of polymerized rosin of tall oil rosin, of wood rosin, or of partially hydrogenated wood rosin, the partially hydrogenated methyl ester of rosin; and terpene resins including polyterpene and polymers of $\alpha$-pinene or $\beta$-pinene.

The gumbase of the present invention having the foregoing characteristics, can be formulated using straightforward techniques conventional in this field. Typically, the polyisobutylene and polyvinyl acetate are placed in a mixer, and the other ingredients are gradually fed in while the contents of the mixer are subjected to heat and high shear or kneading. Heating to temperatures on the order of about 100° C. to about 120° C., while mixing for about 2 to 4 hours, are typical formulating conditions. Chewing gum incorporating this invention can be made in the conventional manner, which is familiar to those of ordinary skill in this art.

The present invention contemplates the optional inclusion of a sweetener component which comprises any one or more sweeteners known in the art, including both intense and bulk sweeteners. Thus, sweeteners may be chosen from the following non-limiting list, which includes sugars such as sucrose, glucose, corn syrup, dextrose, invert sugar, fructose and mixtures thereof; saccharine and its various salts such as the sodium or calcium salt; cyclamic acid and its various salts such as the sodium salt; free aspartame; dihydrochalcone sweetening compounds; glycyrrhizin; steviu rebaudiana (stevioside); monellin, thaumatin, polydextrose, and maltitol; and sugar alcohols such as sorbitol, sorbitol syrup, mannitol, xylitol, and the like. Also contemplated as a sweetener is the nonfermentable sugar substitute hydrogenated starch hydrolysate (also known as Lycasin) which is described in U.S. Pat. No. Re. 26,959. Also contemplated is the synthetic sweetener 3,6-dihydro-6-methyl-1-1,2,3-oxathiazin-4-one-2,2-dioxide, particularly the potassium (acesuliflame-K), sodium and calcium salts thereof as described in German Pat. No. 2,001,017.7.

Products within the scope of the present invention may include no sweetener at all. If sweetener is included, the amount of sweetener is effective to provide the desired degree of sweetness, generally 0.001 to 70 wt. % of the final product.

Suitable flavorants include both natural and artificial flavors and mints, such as oil of peppermint, menthol, oil of spearmint, vanilla, oil of cinnamon, oil of wintergreen (methyl salicylate), and various fruit flavors, including but not limited to lemon oil, orange oil, grape flavor, lime oil, grapefruit oil, apple, apricot essence, and combinations thereof. The flavorings are generally utilized in amounts that will vary depending upon the individual flavor, and may, for example, range in amounts of about 0.5% to about 3% by weight of the final composition weight.

Colorants can be present in the chewing gums of the present invention. Examples include the pigments such as titanium dioxide, natural colorants such as turmeric and carmine, and other dyes suitable for food, drug and cosmetic applications known as F.D. & C. dyes, and the like. The materials may be incorporated in amounts of up to about 1% by weight, preferably up to about 6% by weight.

The non-stick characteristics of gum according to the present invention have been demonstrated using test panels of persons wearing removable dental work (partial, bridges, upper or lower or full dentures). In testing of about 600 such people, who were asked to rank stickiness to their dental work from 1 (always stuck to dental work) to 7 (did not stick to dental work), gum according to the present invention scored 6.58, with 85% of the respondents giving the gum a score of 7. The gum also exhibits superior flavor retention.

Examples of a gum base in accordance with the present invention, useful in formulating chewing gums exhibiting little or no tack, are set forth in the following table:

| Component | Amount, Wt. % | | | |
|---|---|---|---|---|
| | 1 | 2 | 3 | 4 |
| Filler (Calcium Carbonate) | 20.8 | 23.5 | 25.0 | 27.0 |
| Polyisobutylene (low mol. wt.) | 11.6 | 12.0 | 12.0 | 9.8 |
| Polyisobutylene (high mol. wt.) | 2.9 | 2.0 | 2.5 | 2.5 |
| Polyvinyl Acetate | 28.3 | 25.0 | 25.0 | 25.0 |
| Microcrystalline Wax | 2.8 | 10.0 | 5.0 | 5.0 |
| Polyethylene (Mol. wt. = 2,000) | 5.3 | 5.0 | 3.0 | 5.0 |
| Hydrogenated and Partially Hydrogenated Vegetable Oils | 23.0 | 21.0 | 24.5 | 24.5 |
| Glycerol Monostearate | 5.3 | 1.5 | 3.0 | 3.25 |

What is claimed is:

1. A chewing gum exhibited reduced tack to dental surfaces, comprising a gum base, an optional sweetener component and an optional flavor component, wherein the gum base consists of:
   (a) about 8 to about 18 wt. % of low molecular weight polyisobutylene and about 1 to about 4 wt. % of high molecular weight polyisobutylene;
   (b) about 16 to about 30 wt. % of polyvinyl acetate;
   (c) about 16 to about 30 wt. % of inorganic filler;
   (d) about 1 to about 6 wt. % of polyethylene having a molecular weight of about 2,000;
   (e) about 18 to about 30 wt. % of a fat component selected from the group consisting of hydrogenated and partially hydrogenated vegetable oils and mixtures thereof;
   (f) about 1 to about 6 wt. % of emulsifier; and
   (g) about 2 to about 10 wt. % of microcrystalline wax wherein said chewing gum does not contain a resin or rosin component or derivative.

2. A chewing gum in accordance with claim 1 wherein said inorganic filler is selected from the group consisting of aluminum hydroxide, magnesium hydroxide, alumina, aluminum silicates, calcium carbonate, talc, and combinations thereof.

3. A chewing gum in accordance with claim 2 wherein the filler comprises calcium carbonate.

4. A chewing gum in accordance with claim 1 wherein said low molecular weight polyisobutylene has a Flory molecular weight of about 49,000 to about 60,000; said high molecular weight polyisobutylene has a Flory molecular weight of 750,000 to 1,000,000; and said polyvinyl acetate has a weight average molecular weight of about 7,000 to about 13,000.

5. A chewing gum in accordance with claim 1 comprising a flavorant.

6. A chewing gum according to claim 5 wherein said flavorant is selected from the group consisting of peppermint oil, menthol, cinnamon oil, spearmint oil, vanilla, wintergreen oil, lemon oil, orange oil, grape, lime oil, grapefruit oil, apple, apricot essence, and mixtures thereof.

7. A chewing gum according to claim 1, further comprising a sweetener.

8. A chewing gum according to claim 7 wherein said sweetener is selected from the group consisting of sucrose, glucose, corn syrup, dextrose, invert sugar, fructose, saccharine, salts of saccharine, cyclamic acid, salts of cyclamic acid, aspartame, dihydrochalcones, glycyrrhizin, stevia rebaudiana, monellin, thaumatin, sucralose, isomaltitol, neosugar, lactitol, polydextrose, maltitol, sorbitol, sorbitol syrup, mannitol, xylitol, hydrogenated starch hydrolysate, acesulfame, salts of acesulfame, and mixtures thereof.

* * * * *